March 14, 1967  H. R. TURNER ETAL  3,309,139
VEHICLE SEATS
Filed Sept. 11, 1964  6 Sheets-Sheet 1
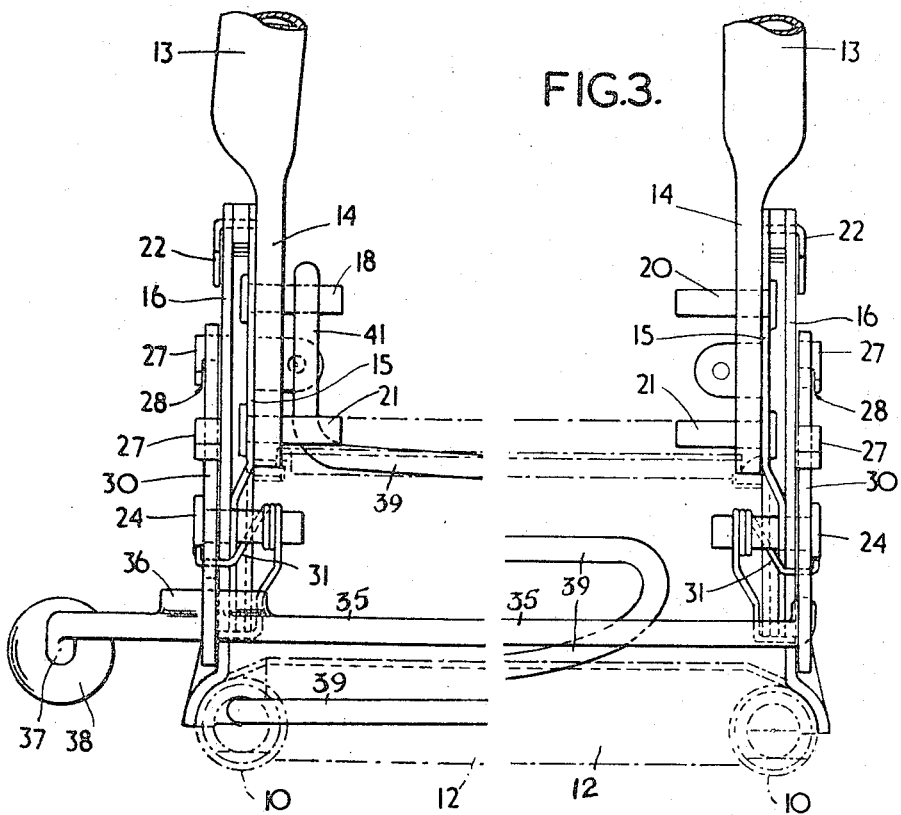
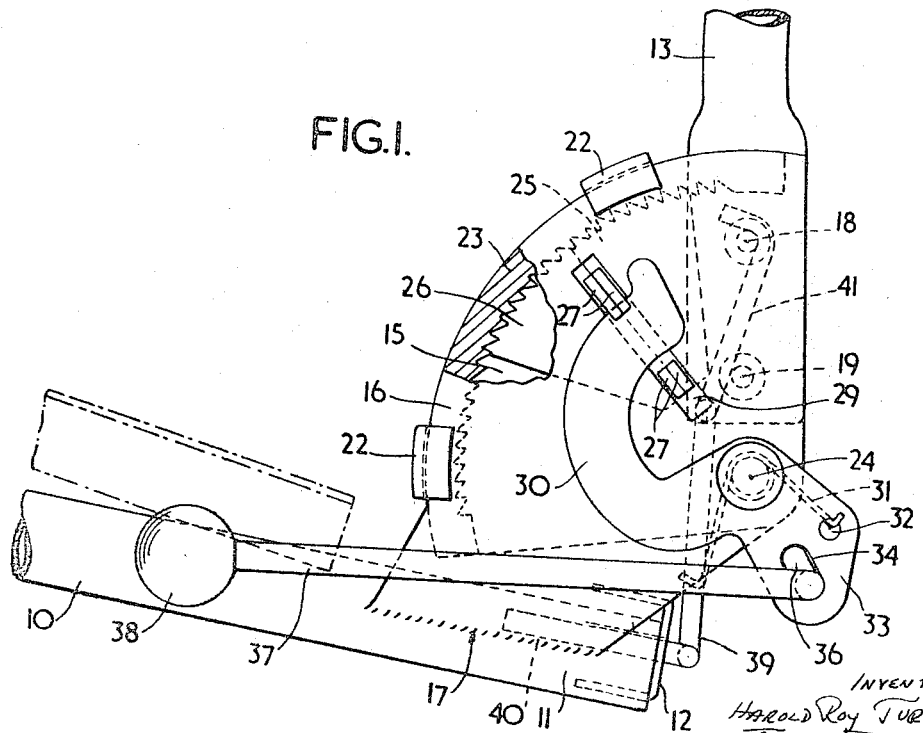

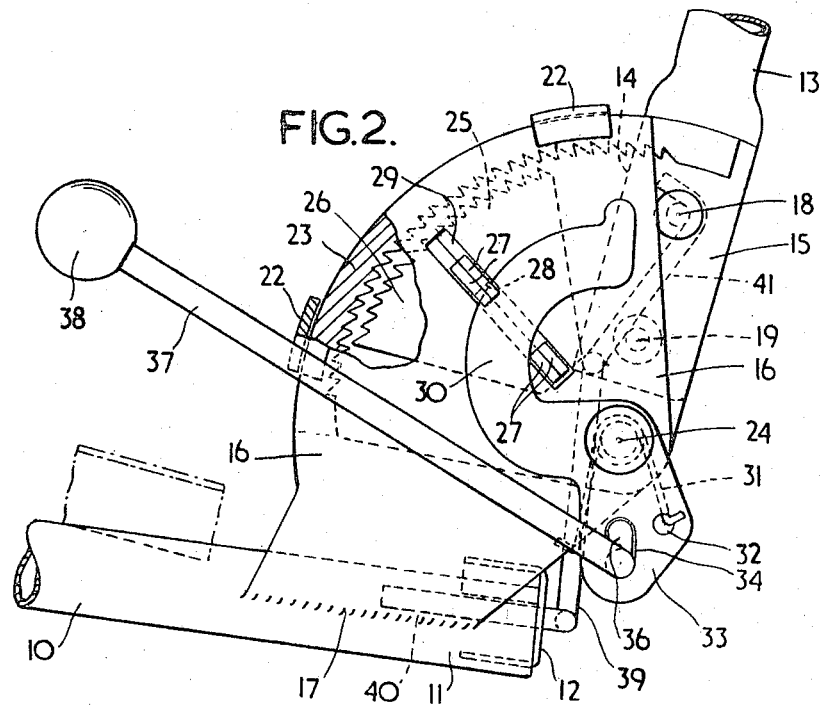
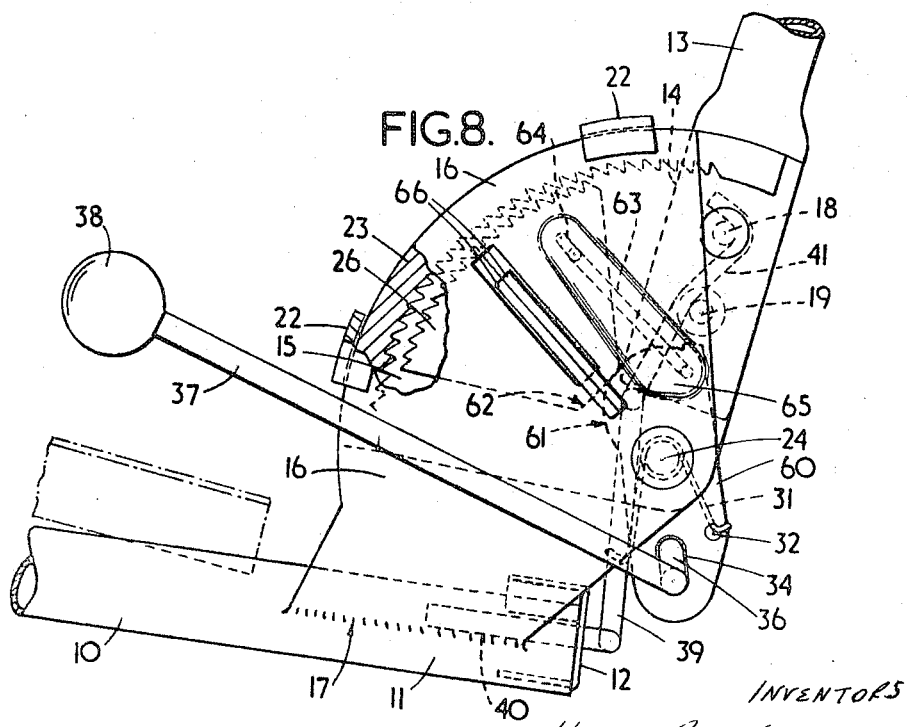

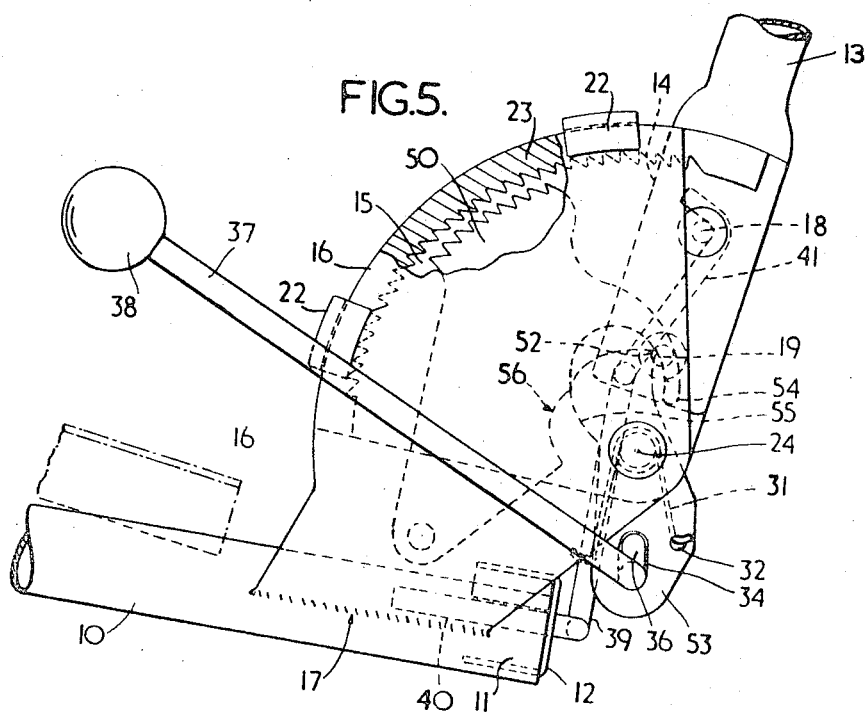

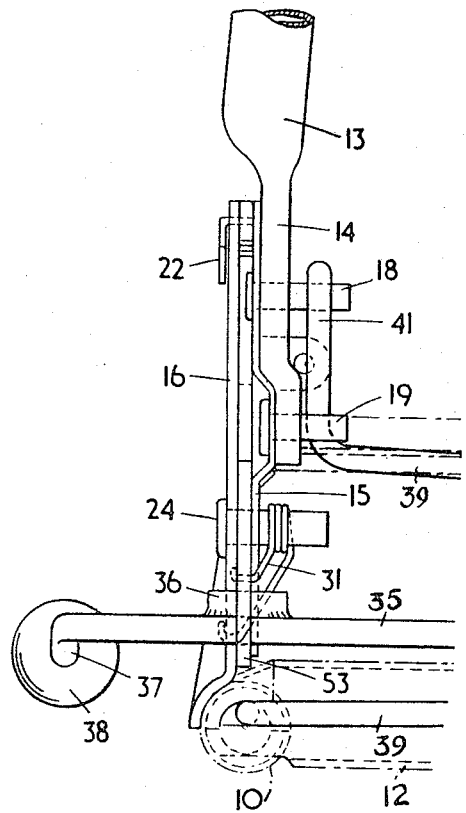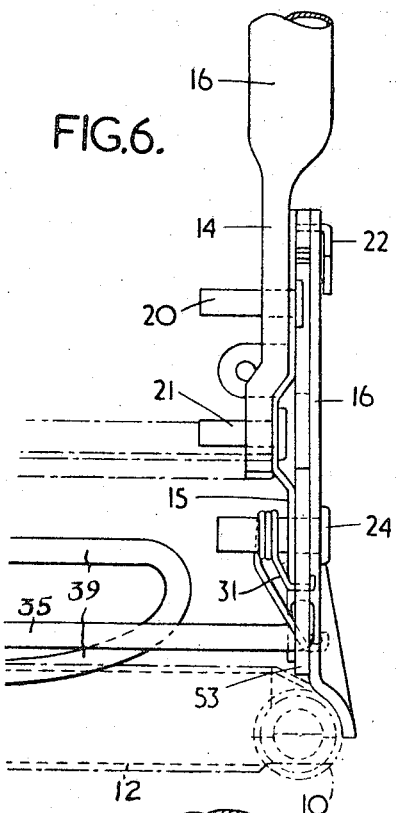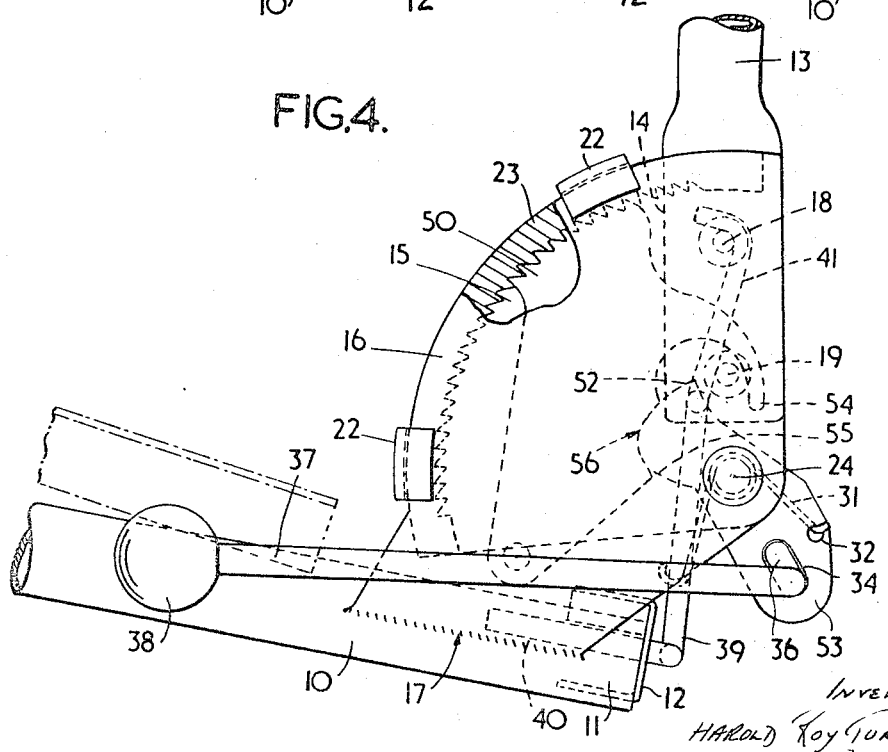

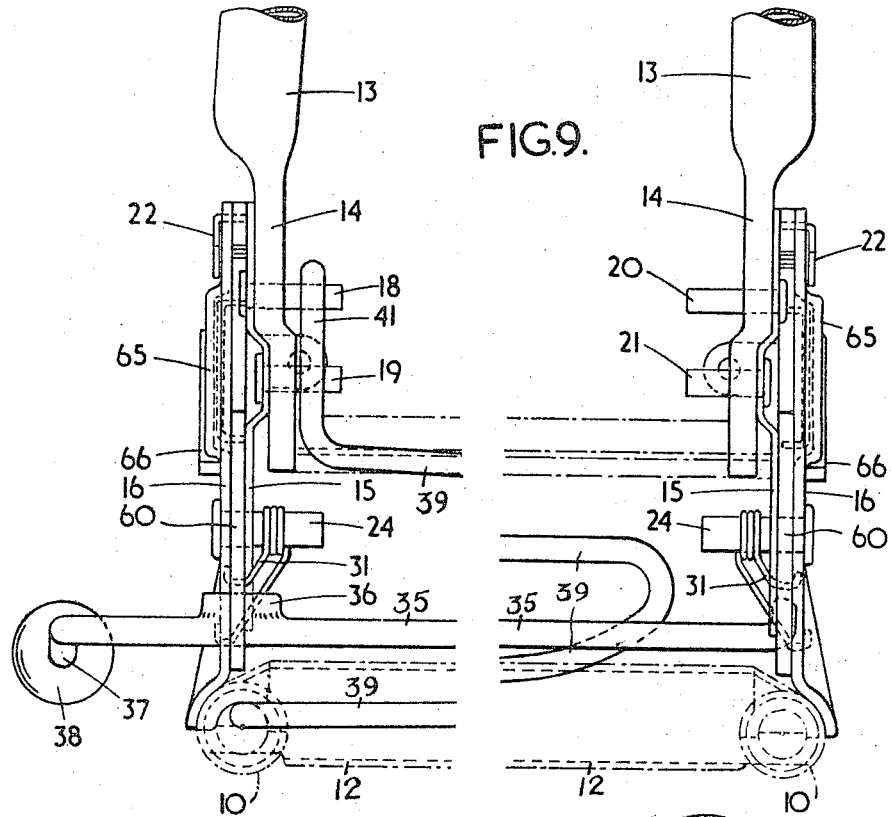

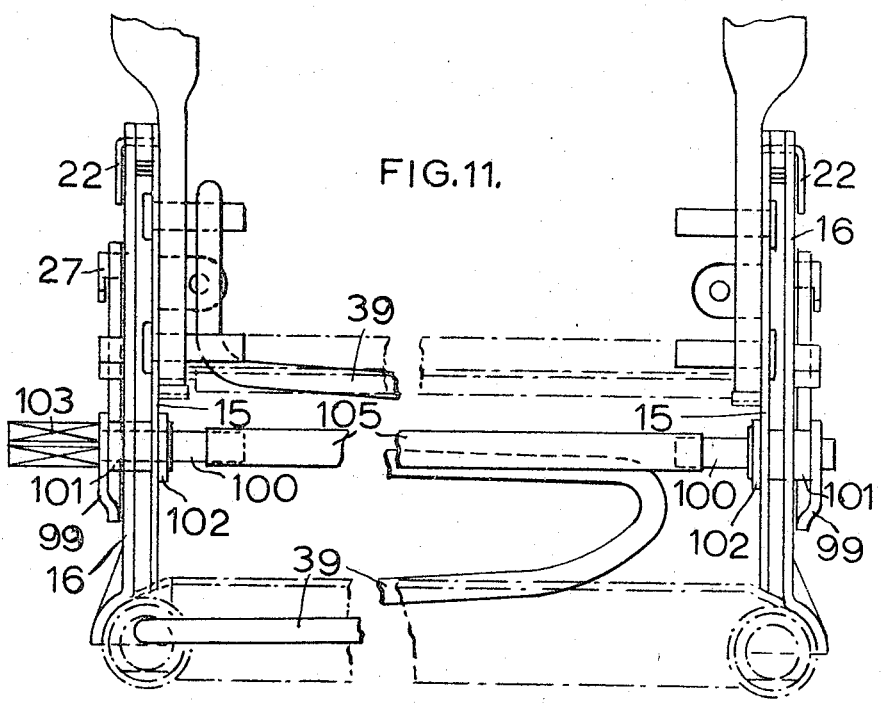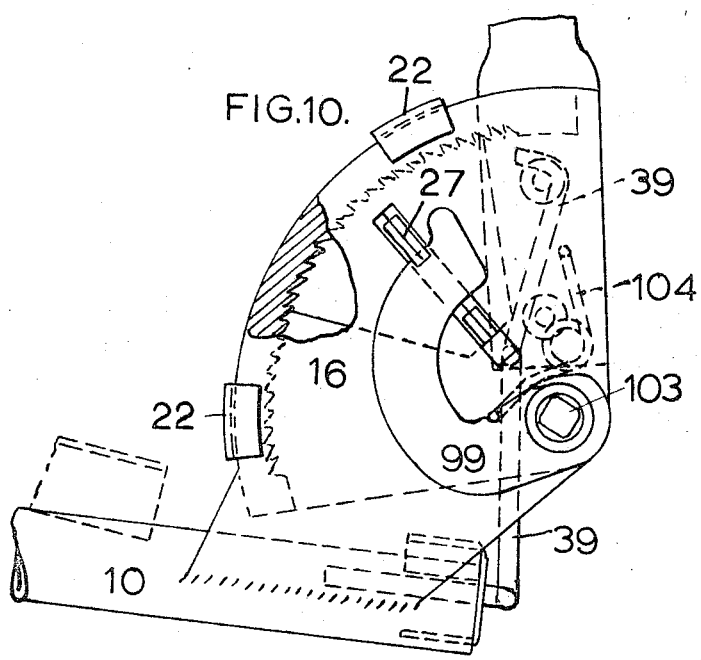

United States Patent Office 3,309,139
Patented Mar. 14, 1967

3,309,139
VEHICLE SEATS
Harold Roy Turner and Joseph Pallant, Willenhall, England, assignors to H. R. Turner (Willenhall) Limited, Willenhall, England, a British company
Filed Sept. 11, 1964, Ser. No. 395,791
Claims priority, application Great Britain, Nov. 6, 1963, 43,752/63
5 Claims. (Cl. 297—367)

This invention is concerned with seats of the kind comprising a seat proper and a backrest which is hinged for angular adjustment relative to the seat proper.

The objects of the invention are to provide improvements effecting economical production of efficient and robust mechanisms for such seats.

In accordance with the invention a seat of the kind referred to having an inclination adjustment mechanism comprises a rack concentric to the hinge axis and a toothed locking plate for meshing wtih the rack, the plate and rack being secured respectively to the two hinged parts, the said plate being mounted for guided movement into and out of mesh, and means being provided for causing such movement, said means including a cam operable in at least one of the directions of movement.

Four embodiments of the invention are now more particularly described with reference to the accompanying drawings, wherein:

FIGURE 1 is an elevation, with parts broken away for clarity, showing a seat mechanism in a first or fully forward position;

FIGURE 2 is a view similar to FIGURE 1 showing the seat mechanism moved towards a reclining position;

FIGURE 3 is a rear elevation of the mechanism;

FIGURES 4–6 are views similar to FIGURES 1–3 but of a second embodiment;

FIGURES 7–9 are views similar to FIGURES 1–3 of a third embodiment; and

FIGS. 10 and 11 are views similar to FIGURES 1 and 3 of a fourth embodiment.

Referring first to FIGURES 1–3, the seat construction comprises a seat squab frame which may consist of a substantially horizontally located U-shaped tube 10 of which the free ends 11 are bridged by a cross-member 12, FIGURE 3. Also provided is a similar back-rest frame 13 of which the free ends 14 are flattened, and located adjacent the ends 11; hence the back-rest frame U is inverted. Normally the frame 10 will be fixed to the vehicle floor or possibly hinged thereto, and reclining movement of the back-rest moves the latter from an upright position rearwardly towards 180° to the plane of the seat-squab frame 10. In use, the back-rest has to bear an increasing share of the load imposed on the seat as the angle of reclining is increased.

Each side of the frames is provided with a seat mechanism comprising a pair of substantially quadrant-shaped metal pressings 15 and 16. Quadrant 16 is welded along its one edge 17 to tube 10, and quadrant 15 is riveted to tube end 14 by rivets 18, 19 (which are also used to anchor a spring end as later explained), and by rivets 20, 21 in the case of the right hand side assembly, FIGURE 3.

The use of rivets to anchor the one quadrant is based on the discovery that welding tends to distort the sheet metal which is most economically used for this part, and that the rivets serve the dual purpose of anchoring the spring, thus producing a net saving as well as avoiding difficulties from distortion.

The inner quadrants 18 which are adjacent one another have integral lugs 22 which engage the outer quadrants to hold them together: these inner quadrants also carry arcuate toothed racks 23 which are riveted, spot-welded or otherwise secured about the periphery of the quadrants, the teeth being inwardly located. Both quadrants are pivoted on further rivets 24 which lie on the axis of movement of the back-rest.

Sandwiched between each pair of quadrants is a locking plate comprising a pair of pressings 25, 26 each of which has an integral lug 27, the lugs being face-to-face and having a central gap which extends into part of the lugs at 28, FIGURE 3. The lugs extend through a slot 29 in the outer quadrant which slot serves to retain the pressings together and guide them for radial unitary movement towards and away from the axis of rivets 24. The curved outer edge of the plates is toothed complementary to the racks.

A somewhat C-shaped cam plate 30 is associated with each mechanism, passing through the gap in the locking plate lugs and engaging in the cut-away 28: each cam is pivoted on rivet 24 and is spring urged to the FIGURE 1 position by a hairpin spring 31 engaged behind edge 32 of quadrant 16 in a hole in an extension 33 of the plate. The plate in the case of the left hand mechanism of FIGURE 3 is formed with an elongated slot 34 through which extends an operating rod 35; the rod has a thickened portion formed by welding a short piece of rod 36 thereto in the zone which extends through the slot and the slot is larger than the thickened portion and for the purpose hereinafter described.

The other plate 30, i.e. the right hand one in FIGURE 3 has a circular hole and the end of rod 35 is welded therein.

Rod 35 has a transverse extension 37 with a knob 38 on its end.

The spring previously referred to which is anchored on the rivets is a long U-shaped torsion-bar spring 39 which extends near the pivotal axis of the seat back.

One limb has an end portion 40 located in tube 10 as an anchorage, and the other end 41 of the other limb is bent transversely in the plane of the U and passed between the two rivets 18, 19, which anchor it.

In operation, hairpin springs 31 hold the cam plates 30 in the position shown in FIGURES 1 and 2 and hence hold the locking plate and rack teeth in mesh.

To adjust the seat back inclination, knob 38 is raised to move rod 35 angularly about the pivotal axis or rivet 24, and the clearance about the rod 35 and its thickening 36 is taken up quickly so that both cam plates move substantially in unison to take the median position of the cam plates towards and through the gaps in the locking plates and withdraw the teeth of the latter from the racks. The torsion-bar spring then tends to move the seat-back to the FIGURE 1 position but the user, who will normally be seated, may lean back to overcome the spring: when the seat back is in the desired position the knob is released. The hairpin springs 31 return the knob and rod and also the cam plates so that the locking plates are spring driven to take their teeth into mesh with the racks and this locks the mechanism once more. In the return or relocking movement, the clearance in the slot 34 in one plate permits the plates to move independently so that if the seat back is slightly distorted rendering one set of teeth further out of phase with the complementary teeth, or if there is any grit or the like impeding re-meshing, one or other set will mesh immediately whilst the spring on the other set acts to cause slightly delayed meshing on the second set. This lost-motion mechanism also compensates for torsion in the rod 35.

It will be noted that the mechanism offers little obstacle to trimming of the seat since the cam plates may be covered by a flap of trim cloth: if desired a further plate or bar may span each cam plate to prevent them being fouled. Furthermore the spring 35 may offer a large effort to raise the seat back, which increases with the load required, but again does not impede the trim.

The mechanism shown in FIGURES 4–6 is generally similar to that in FIGURES 1–3 with the following exceptions: the locking plate 50 is a single plate pivoted on a rivet 51 and is wholly trapped between the quadrants; it is pulled out of mesh by the nose 52 of a lever 53 (operated by the handle and knob 38) which nose engages with a projection 54 on the locking plate for this purpose; it is returned into mesh by a cam heel 55 on the lever engaging a complementary edge 56 of the plate 50.

The mechanism shown in FIGURES 7–9 again differs from that in FIGURES 1–3 in having the cam plate disposed between the quadrants and likewise the cam plate comprises a lever 60 having a heel 61 engaging with an edge 62 of the locking plate to drive the latter into mesh: the plate is pulled out of mesh by a link 63 hooked on to the plate and the lever and running in a slot 64 in the plate, this link lying in a blister 65 in the outer quadrant: the locking plate is guided in a similar manner to that in FIGURES 1–3 but the lugs do not project above the quadrant surface.

Both the FIGURES 4–6 and 7–9 constructions are even easier to trim than the FIGURES 1–3 constructions.

The construction shown in FIGURES 10 and 11 is once again basically similar to that in the preceding examples, most particularly FIGURES 1–3. The differences are in the C-shaped cam 99 which is fast with a spindle 100 and which is journalled in a bush 101 which is welded to the quadrant 16: a shoulder 102 on the bush abuts quadrant 15 and the shoulder and welding together maintain the assembly together.

The cam 99 has a squared shaft 103 fast therewith, and the shaft and spindle axes are co-axial.

It will be noted that cam 99 does not have any extension such as 33, FIGURE 1, and is adapted to be operated, i.e. to turn the cam, by a handle (not shown) which fits on to the squared shaft 103.

The cam is urged anti-clockwise about its pivotal axis by a hairpin spring 104 replacing spring 31, and spring 104 has tails engaged in the quadrant 16 and cam 99 for this purpose.

The spindles 100 of the two mechanisms (FIGURE 11) i.e. one on each side of the seat, are connected by a tube 105 which is welded or pinned to the two spindles. The tube wall permits torsional twist more readily than the solid rod 35 of FIGURES 1–3, and this permits individual re-meshing of the two sets of teeth in a similar manner to the lost-motion slot etc. of the previous figures.

It will be appreciated that with the FIGURES 10–11 mechanism, inclination adjustment is not accompanied by movement of a coupling rod 35 through an arc, but only of angular movement about its own axis of tube 105 which extends along the actual hinge axis of the backrest to the seat proper. This simplifies trimming. Moreover, the trim may extend across quadrant 16 and cam 99, and merely have a hole to accommodate shaft 103, so that the operating handle per se (not shown) can be fitted after trimming.

We claim:
1. Seat back-rest adjusting mechanism comprising:
 (i) a pair of plate-like parts which are
  (a) each of generally quadrant shape,
  (b) are located face-to-face and generally parallel,
  (c) are fixed together about a hinge axis
  (d) and are respectively adapted for attachment to the seat and seat back-rest,
  (e) said hinge axis being located at the apices of said quadrants and with the arcuate edges of said quadrants concentric to the said axis;
 (ii) an arcuate rack fixed to one of said quadrant parts
  (a) said rack having its teeth directed towards said hinge axis,
  (b) said rack lying between said quadrant parts;
  (c) and said rack extending along the whole length of the arcuate edge of said one quadrant part;
 (iii) a toothed locking plate which is:
  (a) located between said quadrant parts and is slidable freely therebetween;
  (b) is disposed between the hinge axis and the rack and has its teeth outwardly directed for mesh with the rack;
 (iv) a cam which is:
  (a) pivoted on said hinge axis,
  (b) has a cam edge eccentric to said axis,
  (c) and said cam edge is disposed to operate on said locking plate so that in movement of the cam about the axis the locking plate is carried into or out of mesh with the rack;
 (v) spring means operatively associated with said cam and urging the latter into the position in which said teeth are meshed;
 (vi) and lever means for moving said cam against said spring.
2. Seat back-rest adjusting mechanism as claimed in claim 1 wherein:
 (i) said locking plate includes a lug which extends normally of said plate;
 (ii) one of said quadrant plates has a slot therein extending radially of the hinge axis,
 (iii) and said lug extends through said slot to be guided thereby for movement into and out of mesh.
3. Seat back-rest adjusting mechanism as claimed in claim 2 wherein said cam is generally C shaped and abuts said lug on the locking plate.
4. Seat back-rest adjusting mechanism as claimed in claim 2 wherein said cam is connected to said locking plate by a link for pulling said locking plate out of mesh with said rack.
5. Seat back-rest adjusting mechanism as claimed in claim 1 wherein one set of said mechanism is provided at each side of a seat and the two sets of mechanisms are connected by a common operating lever which comprises a rod extending eccentrically of the common hinge axis and passing through slots in the respective cams, one of said slots being enlarged to provide a lost motion to allow independent re-meshing of the respective teeth.

References Cited by the Examiner
UNITED STATES PATENTS

| 2,784,770 | 3/1957 | Herr | 297—367 |
| 3,008,765 | 11/1961 | Tischler et al. | 297—367 |
| 3,051,526 | 8/1962 | Werner et al. | 297—373 |

FRED C. MATTERN, JR., *Primary Examiner.*

J. D. PUFFER, *Assistant Examiner.*